United States Patent
Ata et al.

(10) Patent No.: US 11,635,517 B2
(45) Date of Patent: Apr. 25, 2023

(54) PARAMETER ADJUSTMENT DEVICE, TRAINING DEVICE, AND MEASUREMENT SYSTEM

(71) Applicant: Mitsubishi Electric Corporation, Tokyo (JP)

(72) Inventors: Daiki Ata, Tokyo (JP); Satoshi Namematsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/798,082

(22) PCT Filed: Apr. 15, 2020

(86) PCT No.: PCT/JP2020/016513
§ 371 (c)(1),
(2) Date: Aug. 8, 2022

(87) PCT Pub. No.: WO2021/210086
PCT Pub. Date: Oct. 21, 2021

(65) Prior Publication Data
US 2023/0084819 A1    Mar. 16, 2023

(51) Int. Cl.
G01S 17/00    (2020.01)
G01S 17/08    (2006.01)
G06N 20/00    (2019.01)

(52) U.S. Cl.
CPC ............. *G01S 17/08* (2013.01); *G06N 20/00* (2019.01)

(58) Field of Classification Search
USPC ........................................................ 356/4.01
See application file for complete search history.

(56) References Cited

U.S. PATENT DOCUMENTS

2016/0261791 A1    9/2016 Satoyoshi
2017/0061634 A1    3/2017 Nash et al.
(Continued)

FOREIGN PATENT DOCUMENTS

JP    2006-226852 A    8/2006
JP    2010-271152 A    12/2010
(Continued)

OTHER PUBLICATIONS

International Search Report and Written Opinion dated Jun. 23, 2020, received for PCT Application PCT/JP2020/016513, filed on Apr. 15, 2020, 8 pages including English Translation.
(Continued)

*Primary Examiner* — James R Hulka
(74) *Attorney, Agent, or Firm* — Xsensus LLP

(57) ABSTRACT

A parameter adjustment device (500) adjusts a parameter relating to control of laser light emitted from a measurement sensor (210) onto an object. A parameter calculator (520) calculates the parameter by applying, to a trained model generated through machine learning using training data sets each including waveform data of an amount of light received by the measurement sensor (210) and data indicating the parameter used to acquire the waveform data, waveform data newly acquired in a new state. The parameter calculated by the parameter calculator (520) enables measurement of the object using the measurement sensor (210) in the new state. A parameter outputter (530) outputs data indicating the parameter calculated by the parameter calculator (520).

11 Claims, 19 Drawing Sheets

(56) References Cited

U.S. PATENT DOCUMENTS

| | | | |
|---|---|---|---|
| 2019/0154442 A1 | 5/2019 | Annovi et al. | |
| 2020/0284883 A1* | 9/2020 | Ferreira | G01S 17/10 |
| 2021/0011161 A1* | 1/2021 | Chen | G06N 3/045 |
| 2022/0043148 A1* | 2/2022 | Ata | G01C 3/00 |

FOREIGN PATENT DOCUMENTS

| | | | |
|---|---|---|---|
| JP | 2015-163841 A | 9/2015 | |
| JP | 2016-161473 A | 9/2016 | |
| JP | 2018-525636 A | 9/2018 | |
| WO | WO-2019220474 A1 * | 11/2019 | G01S 13/89 |

OTHER PUBLICATIONS

Decision to Grant dated Sep. 15, 2020, received for JP Application 2020-544061, 5 pages including English Translation.

* cited by examiner

FIG.3

| PARAMETER | LIGHT-EMISSION-AMOUNT ADJUSTMENT AREA SPECIFICATION PARAMETER | | | | | INTERFERENCE AVOIDANCE PARAMETER | |
|---|---|---|---|---|---|---|---|
| MEASUREMENT SENSOR | EMISSION LIGHT AMOUNT | MEASUREMENT CENTER POSITION | MEASUREMENT START POSITION | MEASUREMENT END POSITION | ... | SAMPLING INTERVAL | ... |
| FIRST MEASUREMENT SENSOR | LI01 | CT01 | ST01 | ED01 | ... | SI01 | ... |
| SECOND MEASUREMENT SENSOR | LI02 | CT02 | ST02 | ED02 | ... | SI02 | ... |

FIG.5A
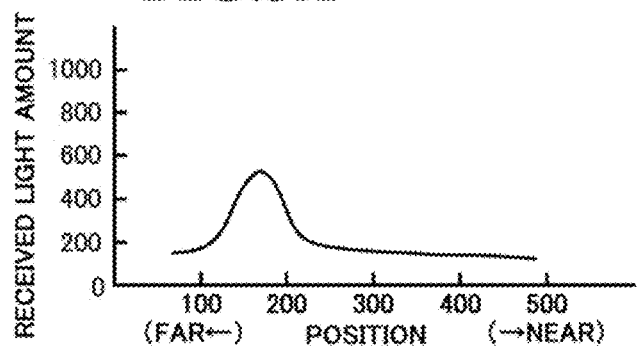
ADJUST EMISSION LIGHT AMOUNT
AND MEASUREMENT CENTER
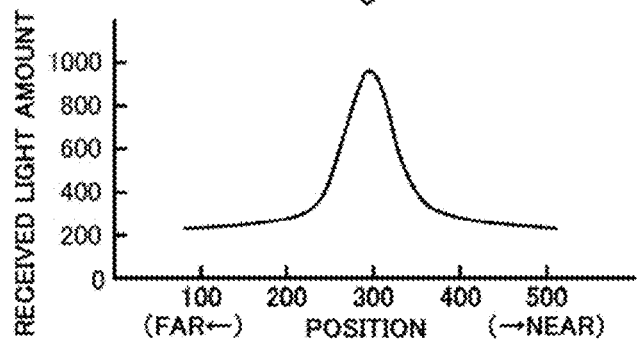

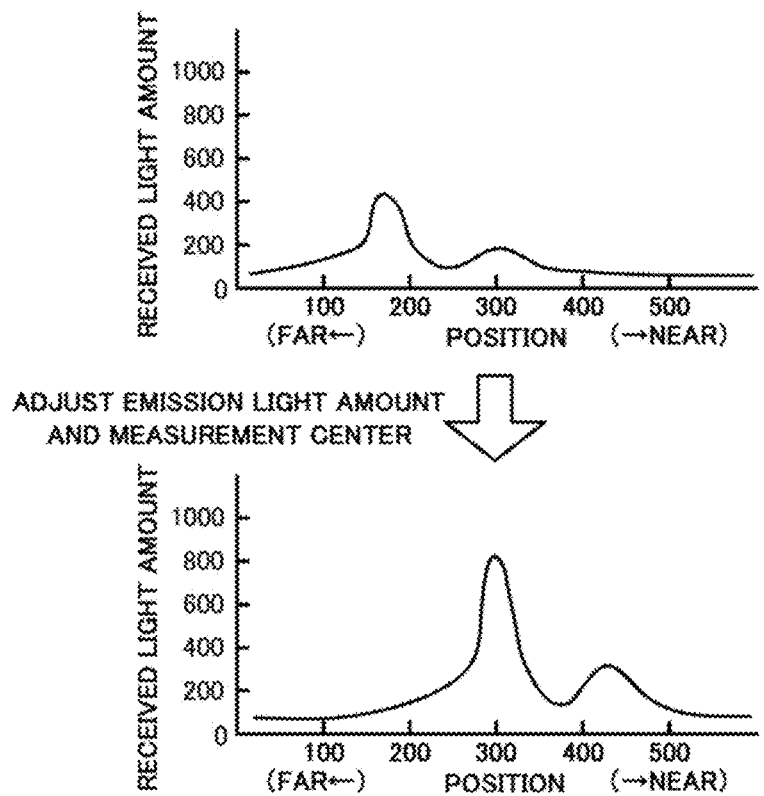

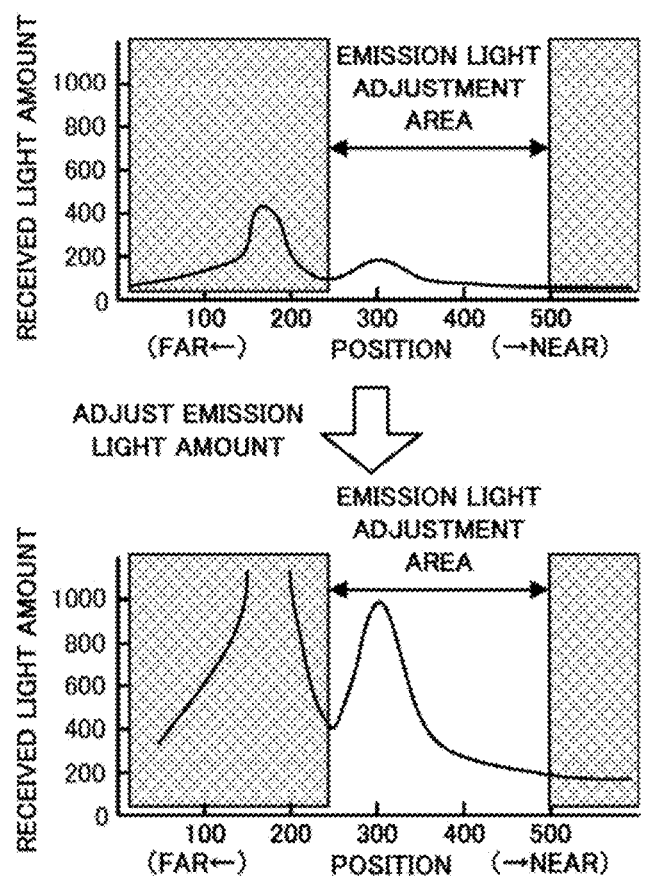

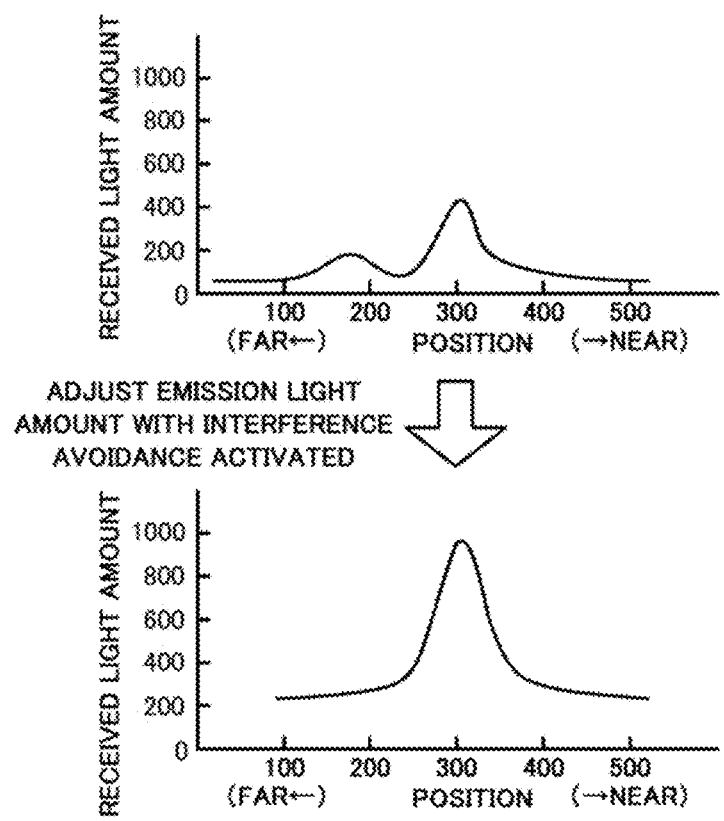

PARAMETER ADJUSTMENT DEVICE, TRAINING DEVICE, AND MEASUREMENT SYSTEM

CROSS-REFERENCE TO RELATED APPLICATION

The present application is based on PCT filing PCT/JP2020/016513, filed Apr. 15, 2020, the entire contents of which are incorporated herein by reference.

TECHNICAL FIELD

The present disclosure relates to a parameter adjustment device, a training device, a measurement system, a parameter adjustment method, and a program.

BACKGROUND ART

A laser displacement sensor measures an object with laser light. When, for example, the laser displacement sensor measures an object with multiple sensor heads or measures a transparent object, laser light beams may interfere with one another and the received light amount may have two or more peak waveforms instead of one peak waveform to be normally included. Thus, the laser displacement sensor may not acquire stable measurement results. A user thus uses an information processing system including a computer to analyze the waveforms in the received light amount, and then adjusts parameters associated with laser light interference.

As an example of such an information processing system, Patent Literature 1 describes an optical displacement measurement system that can set imaging conditions. The optical displacement measurement system described in Patent Literature 1 calculates, based on preset imaging parameters and results of imaging based thereon, the reliability of the imaging parameters that enable appropriate measurements, and displays multiple imaging parameters in descending order of reliability to allow the user to select any of the imaging parameters.

As an example of such a computer, Patent Literature 2 describes an inspection device that can adjust control parameters for a displacement meter that acquires a two-dimensional profile of a cross-sectional shape of an object. The inspection device described in Patent Literature 2 can reduce the effects of stray light or shortage in the received light amount by adjusting the shape and the area of an image mask serving as an example adjustment parameter.

CITATION LIST

Patent Literature

Patent Literature 1: Unexamined Japanese Patent Application Publication No. 2016-161473
Patent Literature 2: Unexamined Japanese Patent Application Publication No. 2015-163841

SUMMARY OF INVENTION

Technical Problem

For the optical displacement measurement system described in Patent Literature 1 and the inspection device described in Patent Literature 2, a user manually sets the parameters. Thus, depending on the skills, the user may inappropriately set the parameters and inappropriately measure an object. In particular, the optical displacement measurement system described in Patent Literature 1 can simply select an imaging parameter from the limited types of imaging parameters preset by a user. Thus, irrespective of the user selecting an optimal imaging parameter, the optical displacement measurement system may perform inappropriate measurement. The inspection device described in Patent Literature 2 cannot increase the received light amount despite adjustment of the shape and the area of an image mask serving as adjustment parameters, and thus receives an insufficient amount of light used to acquire a two-dimensional profile.

The present disclosure is made in view of the aforementioned circumstances, and an objective of the present disclosure is to appropriately measure an object.

Solution to Problem

To achieve the above objective, a parameter adjustment device according to an aspect of the present disclosure is a device for adjusting a parameter relating to control of laser light emitted from a measurement sensor onto an object. The parameter adjustment device includes a parameter calculator and a parameter outputter. The parameter calculator calculates the parameter by applying, to a trained model generated through machine learning using training data sets each including waveform data of an amount of laser light received by the measurement sensor from the object and data indicating the parameter to acquire the waveform data, waveform data newly acquired in a new state in which the measurement sensor emits laser light onto the object. The parameter calculated by the parameter calculator enables measurement of the object using the measurement sensor in the new state. The parameter outputter outputs data indicating the parameter calculated by the parameter calculator.

Advantageous Effects of Invention

In the above aspect of the present disclosure, by applying the waveform data newly acquired in the new state to the trained model generated through machine learning using the training data sets each including the waveform data and the data indicating the parameter the parameter enabling measurement of the object using the measurement sensor in the new state is calculated, and then is output. Thus, the object can be appropriately measured with the measurement sensor using the parameter identified from the output data.

BRIEF DESCRIPTION OF DRAWINGS

FIG. 3 is a table of example parameters in the present embodiment;

FIG. 5A is a first diagram describing adjustment of an emission light amount and the measurement center without an emission light adjustment area being specified;

FIG. 5B is a second diagram describing adjustment of an emission light amount and the measurement center without the emission light adjustment area being specified;

FIG. 5C is a diagram describing adjustment of an emission light amount with the emission light adjustment area being specified;

FIG. 5D is a diagram describing adjustment of an emission light amount with an interference avoidance function being activated;

DESCRIPTION OF EMBODIMENTS

Figure 1:
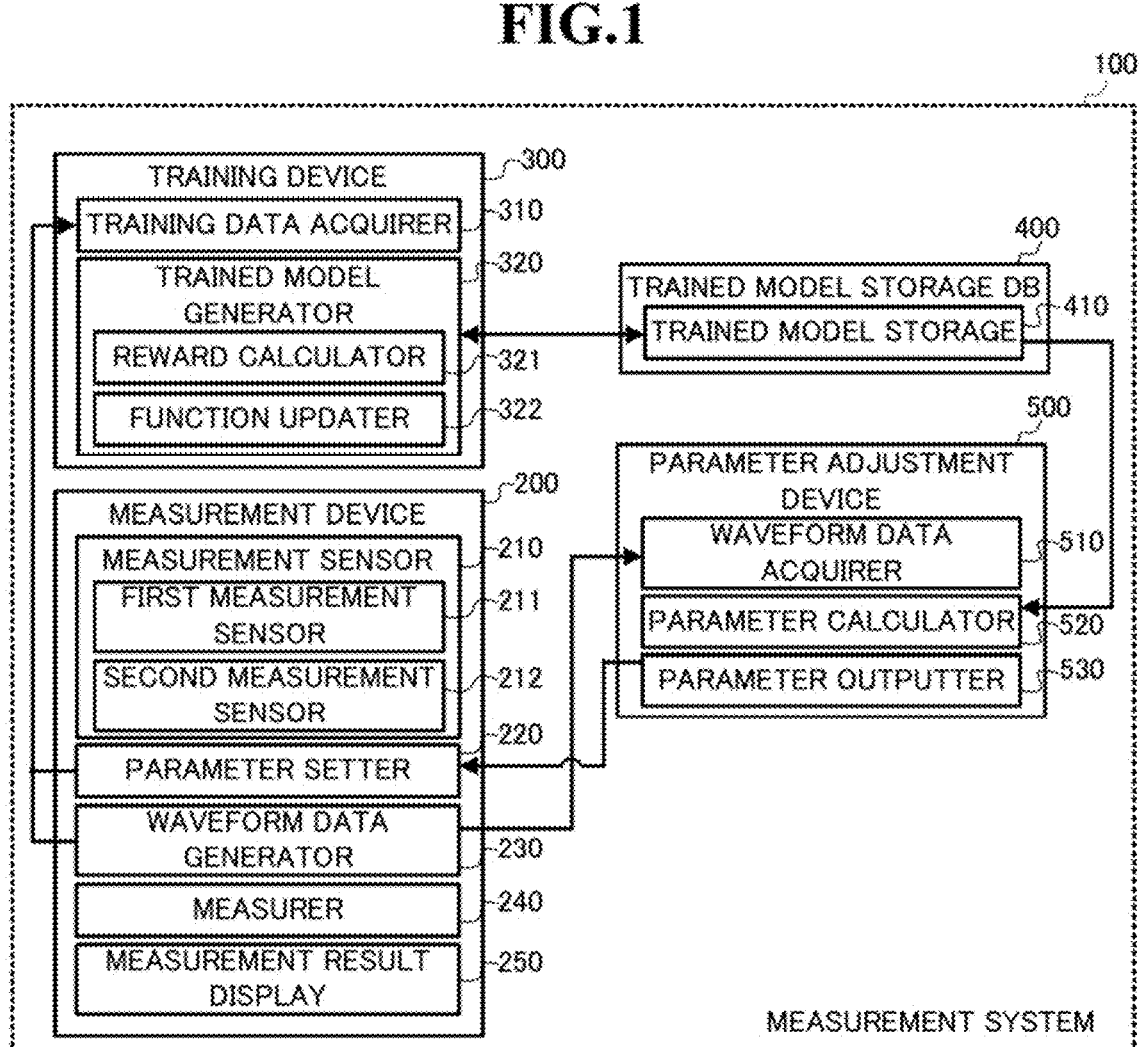
FIG. 1 is a functional block diagram of a measurement system according to an embodiment of the present disclosure.

A parameter adjustment device, a training device, a measurement system, a parameter adjustment method, and a program according to one or more embodiments of the present disclosure are described in detail with reference to the drawings. In the drawings, the same or corresponding components are assigned the same reference sign.

A measurement system according to one or more embodiments of the present disclosure measures an object with a measurement sensor. A parameter adjustment device, a parameter adjustment method, and a program according to one or more embodiments of the present disclosure adjust parameters relating to control of laser light emitted from the measurement sensor onto an object during measurement. A training device according to one or more embodiments of the present disclosure generates, through machine learning, a trained model used by the parameter adjustment device, the parameter adjustment method, and the program for adjusting the parameters.

FIG. 1 is a functional block diagram of a measurement system according to an embodiment of the present disclosure.

As illustrated in FIG. 1, a measurement system 100 according to the present embodiment includes a measurement device 200 including a laser displacement sensor that measures an object. The laser displacement sensor emits laser light with a laser diode in a sensor head, and performs measurement with a complementary metal-oxide-semiconductor (CMOS) sensor serving as a light receiver receiving an amount of light reflected by the object. The laser displacement sensor measures the amount of movement within a measurement range with respect to a measurement center distance. The measurement system 100 also includes a training device 300 that generates a trained model through machine learning using training data, a trained model storage database (DB) 400 that stores a trained model, and a parameter adjustment device 500 that adjusts parameters using the trained model during measurement. The measurement device 200, the training device 300, the trained model storage DB 400, and the parameter adjustment device 500 can transmit and receive data through a non-illustrated local area network (LAN).

The measurement device 200 includes measurement sensors 210 that measure an object, a parameter setter 220 that sets parameters for each measurement sensor 210, and a waveform data generator 230 that generates waveform data of an amount of laser light received from the object by each measurement sensor 210. The measurement device 200 also includes a measurer 240 that measures the object based on the waveform data, and a measurement result display 250 that displays the measurement results.

The training device 300 includes a training data acquirer 310 that acquires training data, and a trained model generator 320 that generates a trained model through machine learning using the acquired training data.

The trained model storage DB 400 includes a trained model storage 410 that stores the trained model generated by the trained model generator 320.

The parameter adjustment device 500 includes a waveform data acquirer 510 that acquires waveform data, a parameter calculator 520 that calculates parameters by applying the acquired waveform data to the trained model stored in the trained model storage 410, and a parameter outputter 530 that outputs data indicating the calculated parameters.

Figure 2:
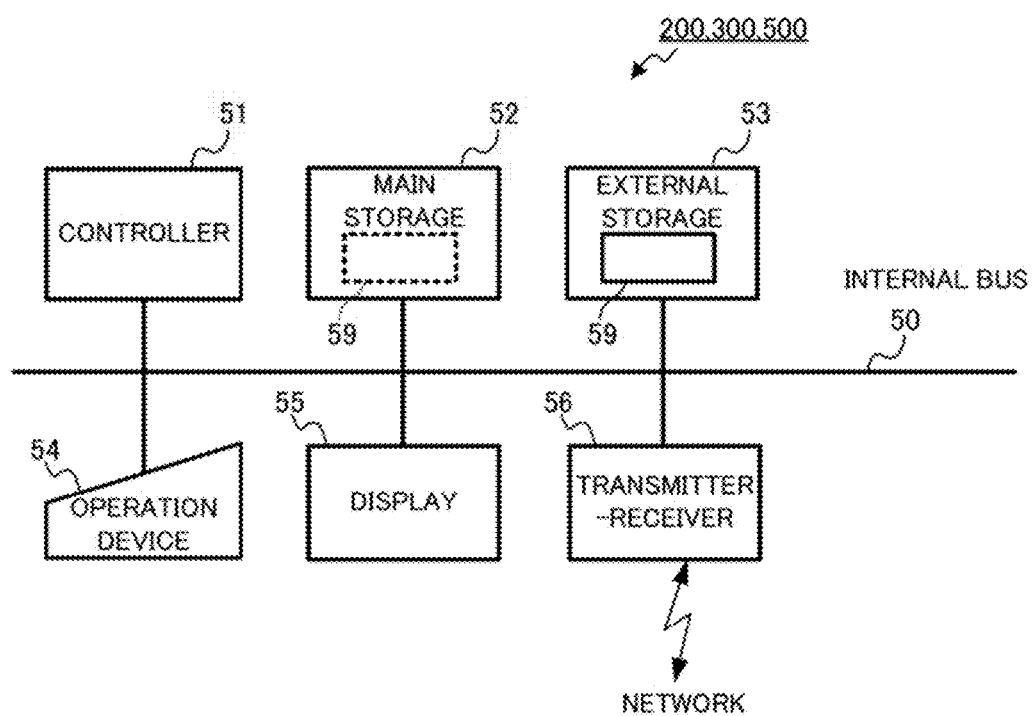
FIG. 2 is a block diagram illustrating hardware configuration of a measurement device, a training device, and a parameter adjustment device according to the present embodiment.

FIG. 2 is a block diagram illustrating hardware configuration of a measurement device, a training device, and a parameter adjustment device according to the present embodiment.

The measurement device 200, the training device 300, and the parameter adjustment device 500 illustrated in FIG. 1 are achieved by the hardware illustrated in FIG. 2. The measurement device 200 includes a controller 51, a main storage 52, an external storage 53, an operation device 54, a display 55, and a transmitter-receiver 56. Similarly to the measurement device 200, the training device 300 includes a controller 51, a main storage 52, an external storage 53, an operation device 54, a display 55, and a transmitter-receiver 56. Similarly to the measurement device 200 and the training device 300, the parameter adjustment device 500 includes a controller 51, a main storage 52, an external storage 53, an operation device 54, a display 55, and a transmitter-receiver 56. Although not illustrated, the trained model storage DB 400 includes at least the external storage 53.

The controller 51 performs processes in accordance with a control program 59. The controller 51 includes a central processing unit (CPU). In accordance with the control program 59, the controller 51 functions as the parameter setter 220, the waveform data generator 230, and the measurer 240 included in the measurement device 200. For example, the controller 51 performs a parameter setting step with the parameter setter 220, a waveform data generation step with the waveform data generator 230, and a measurement step with the measurer 240. The controller 51 functions as the training data acquirer 310 and the trained model generator 320 included in the training device 300 in accordance with the control program 59. For example, the controller 51 performs a training data acquiring step with the training data acquirer 310 and a trained model generation step with the trained model generator 320. In accordance with the control program 59, the controller 51 also functions as the waveform data acquirer 510, the parameter calculator 520, and the parameter outputter 530 included in the parameter adjustment device 500. For example, the controller 51 performs a waveform data acquiring step with the waveform data acquirer 510, a parameter calculation step with the parameter calculator 520, and a parameter output step with the parameter outputter 530.

The main storage 52 loads the control program 59 and is used as a work area for the controller 51. The main storage 52 includes a random-access memory (RAM).

The external storage 53 prestores the control program 59. The external storage 53 provides data stored in the program to the controller 51 in accordance with an instruction from the controller 51, and stores data provided from the controller 51. The external storage 53 includes a nonvolatile memory such as a flash memory, a hard disk drive (HDD), or a solid-state dive (SSD). The external storage 53 functions as the trained model storage 410 in the trained model storage DB 400.

The operation device 54 provides input information to the controller 51. The operation device 54 includes information input components such as a keyboard, a mouse, a touchscreen, and an operation button. The operation device 54 functions as a measurement sensor 210 in the measurement device 200.

The display 55 displays, for example, information input through the operation device 54 and information output from the controller 51. The display 55 includes a display device such as a liquid crystal display (LCD) or an organic electroluminescent (EL) display. The display 55 functions as the measurement result display 250 in the measurement device 200.

The transmitter-receiver 56 transmits or receives information. The transmitter-receiver 56 includes information communication components such as a network termination device or a wireless communication device connected to a network.

In the measurement device 200, the main storage 52, the external storage 53, the operation device 54, the display 55, and the transmitter-receiver 56 are connected to the controller 51 with an internal bus 50. Similarly to the measurement device 200, in the training device 300, the main storage 52, the external storage 53, the operation device 54, the display 55, and the transmitter-receiver 56 are connected to the controller 51 with the internal bus 50. Similarly to the measurement device 200 and the training device 300, in the parameter adjustment device 500, the main storage 52, the external storage 53, the operation device 54, the display 55, and the transmitter-receiver 56 are connected to the controller 51 with the internal bus 50.

The measurement device 200 illustrated in FIG. 1 achieves the functions of the measurement sensors 210, the parameter setter 220, the waveform data generator 230, the measurer 240, and the measurement result display 250 with the controller 51 using the main storage 52, the external storage 53, the operation device 54, the display 55, and the transmitter-receiver 56 as resources. The training device 300 achieves the functions of the training data acquirer 310 and the trained model generator 320 with the controller 51 using, for example, the main storage 52, the external storage 53, the operation device 54, the display 55, and the transmitter-receiver 56 as resources. The parameter adjustment device 500 achieves the functions of the waveform data acquirer 510, the parameter calculator 520, and the parameter outputter 530 with the controller 51 using, for example, the main storage 52, the external storage 53, the operation device 54, the display 55, and the transmitter-receiver 56 as resources.

Referring back to FIG. 1, each measurement sensor 210 is, for example, a laser displacement sensor that measures, with triangulation, a distance to an object, or displacement. The measurement sensors 210 include a first measurement sensor 211 and a second measurement sensor 212. The first measurement sensor 211 includes a first sensor head 211a illustrated in FIGS. 6A, 6B, 7A, 7B, 8A, and 8B, and a non-illustrated first sensor head controller to control the first sensor head 211a. The second measurement sensor 212 includes a second sensor head 212a illustrated in FIGS. 6A, 6B, 7A, and 7B, and a non-illustrated second sensor head controller to control the second sensor head 212a. The first and second sensor head controllers are, for example, programmable logic controllers (PLCs). In the present embodiment, the first and second sensor head controllers are used for the respective measurement sensors 210. In some embodiments, each measurement sensor 210 may include, for example, a sensor head controller that controls both the first sensor head 211a and the second sensor head 212a.

FIG. 3 is a table of example parameters in the present embodiment.

Referring back to FIG. 1, the parameter setter 220 sets, as parameters for each measurement sensor 210, for example, a light-emission-amount adjustment area specification parameter and an interference avoidance parameter illustrated in FIG. 3 for each of the measurement sensors 210. More specifically, the parameter setter 220 sets a light-emission-amount adjustment area specification parameter and an interference avoidance parameter for the first measurement sensor 211 and a light-emission-amount adjustment area specification parameter and an interference avoidance parameter for the second measurement sensor 212. The light-emission-amount adjustment area specification parameter specifies an area for which the amount of laser light emitted from each measurement sensor 210 is adjusted. For example, the light-emission-amount adjustment area specification parameter includes, for at least each of the measurement sensors 210, parameters corresponding to an emission light amount indicating the amount of emitted light, a measurement center position indicating the center position of measurement corresponding to the measurement center distance, a measurement start position indicating the start position of measurement, and a measurement end position indicating the end position of measurement. The interference avoidance parameter is a parameter for preventing laser light emitted from one of the measurement sensors from interfering with light reception by the other measurement sensor. For example, the interference avoidance parameter includes, for at least each of the measurement sensors 210, a parameter indicating a sampling interval during measurement.

For the first measurement sensor 211, for example, the emission light amount value is LI01, the measurement center position value is CT01, the measurement start position value is ST01, the measurement end position value is ED01, and the sampling interval value is SI01. For the second measurement sensor 212, for example, the emission light amount value is LI02, the measurement center position value is CT02, the measurement start position value is ST02, the measurement end position value is ED02, and the sampling interval value is SI02. More specifically, the parameter setter 220 sets, as parameters, the values of, for example, the emission light amount, the measurement center position, the measurement start position, the measurement end position, and the sampling interval for each of the measurement sensors 210.

Referring back to FIG. 1, the waveform data generator 230 generates waveform data of the amount of laser light that is received from the object by each measurement sensor 210 in response to emission of laser light by the measurement sensor 210 onto the object with the parameters set by the parameter setter 220. The waveform data generator 230 generates waveform data of the amount of light received by the first measurement sensor 211 and waveform data of the amount of light received by the second measurement sensor 212.

Figure 4A:
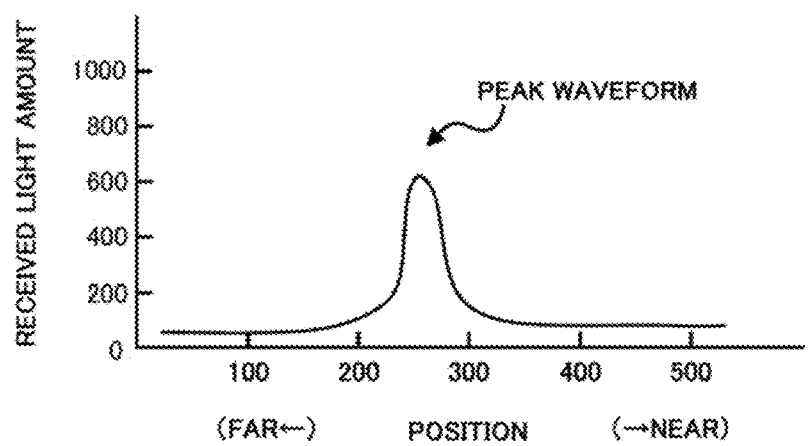
FIG. 4A is a graph of a first display example of waveform data in the present embodiment.
Figure 4B:
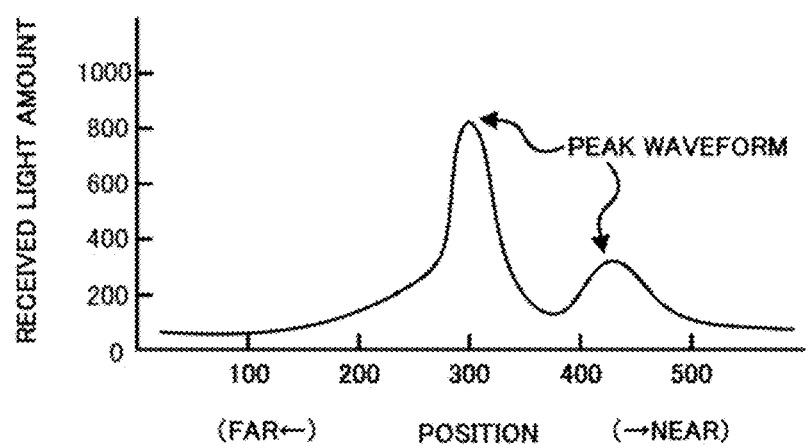
FIG. 4B is a graph of a second display example of waveform data in the present embodiment.

FIG. 4A is a graph of a first display example of waveform data in the present embodiment. FIG. 4B is a graph of a second display example of waveform data in the present embodiment.

For example, the waveform data generator 230 generates waveform data illustrated in FIGS. 4A and 4B based on the amount of laser light received by the first measurement sensor 211. The waveform data pieces are illustrated in FIGS. 4A and 4B in two-dimensional graphs having the vertical axis indicating a received light amount and the horizontal axis indicating an image formation position of the light receiver. The waveform data piece illustrated in FIG. 4A has a single peak waveform with a received light amount of about 600 at the position of about 260. The waveform data piece illustrated in FIG. 4B has, in addition to a peak waveform with a received light amount of about 800 at the position of about 300, a peak waveform with a received light amount of about 350 at the position of about 420. In this case, the actual position of the object can be measured based on the distance to the object from the first measurement sensor 211 identified from the position of about 260 at the peak waveform of the waveform data piece illustrated in FIG. 4A.

FIG. 5A is a first diagram describing adjustment of an emission light amount and the measurement center without an emission light adjustment area being specified.

The waveform data generated by the waveform data generator 230 can be adjusted by the above parameters set by the parameter setter 220. For example, as illustrated in FIG. 5A, when a peak waveform with a received light amount of about 600 occurs at the position of about 160, adjustment of the emission light amount and the measurement center position enable generation of a new peak waveform with a received light amount of about 600 at the position of 300. Thus, the peak waveform can be adjusted to be appropriate for position detection.

FIG. 5B is a second diagram describing adjustment of an emission light amount and a measurement center without the emission light adjustment area being specified.

As illustrated in FIG. 5B, when, for example, multiple peak waveforms occur, one of the peak waveforms is to be used as a reference for adjusting the emission light amount and the measurement center position. In an example illustrated in FIG. 5B, in addition to a measurement target peak waveform occurring at the position of 300, a nontarget peak waveform occurs at the position of about 160. In this case, when a metal circuit pattern is located at a nontarget portion with a measurement target being located on the surface of a transparent substrate, the nontarget peak waveform has a received light amount of 400 larger than the received light amount of about 200 of the measurement target peak waveform. Thus, the peak waveform is adjusted in accordance with the nontarget peak waveform having a larger received light amount, and the emission light amount and the measurement center position are adjusted to newly generate a nontarget peak waveform with a received light amount of about 800 at the position of 300 as illustrated in FIG. 5B.

FIG. 5C is a diagram describing adjustment of an emission light amount with the emission light adjustment area being specified.

With the light-emission-amount adjustment area specification parameter activated, as illustrated in FIG. 5C, when the emission light adjustment area from the measurement start position to the measurement end position is specified, for example, a nontarget peak waveform can be masked and excluded from the emission light adjustment area with the measurement target peak waveform left within the emission light adjustment area. In this case, adjusting the emission light amount alone without adjusting the measurement center position can newly generate a measurement target peak waveform with a received light amount of about 600 at the position of 300, and thus the peak waveform can be adjusted to be appropriate for position detection.

FIG. 5D is a diagram describing adjustment of an emission light amount with an interference avoidance function being activated.

For example, with measurement performed with the second measurement sensor 212 in addition to the first measurement sensor 211, multiple peak waveforms may occur when a laser light beam emitted from one of the measurement sensors interferes with light reception of the other measurement sensor. For example, as illustrated in FIG. 5D, in addition to the measurement target peak waveform occurring at the position of 300, a nontarget peak waveform may occur at the position of about 160. In contrast, when the interference avoidance parameter is activated, as illustrated in FIG. 5D, no nontarget peak waveform occurs by shifting the sampling interval of one measurement sensor out of the sampling interval of the other measurement sensor. Adjusting the emission light amount alone in this state without adjusting the measurement center position can newly generate a measurement target peak waveform with a received light amount of about 600 at the position of 300, and thus the peak waveform can be adjusted to be appropriate for position detection.

Figure 6A:
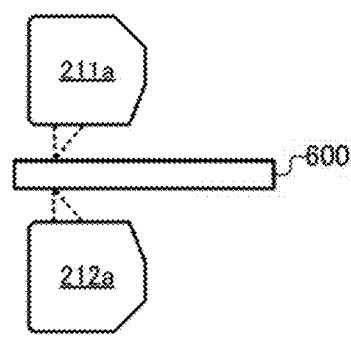
FIG. 6A is a diagram of a first measurement success example in the present embodiment.
Figure 6B:
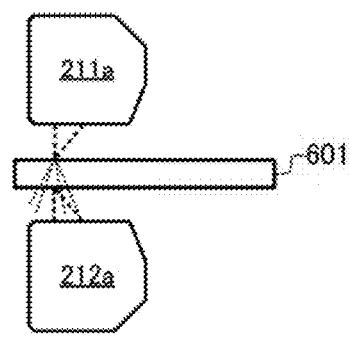
FIG. 6B is a diagram of a first measurement failure example in the present embodiment.

FIG. 6A is a diagram of a first measurement success example in the present embodiment, and FIG. 6B is a diagram of a first measurement failure example in the present embodiment.

The measurer 240 measures an object based on the waveform data. For example, when the first sensor head 211a and the second sensor head 212a are located at the positions to vertically hold the object in between as illustrated in FIGS. 6A and 6B, the measurer 240 measures the thickness of the object based on the waveform data of the amount of light received by the first measurement sensor 211 and the waveform data of the amount of light received by the second measurement sensor 212.

More specifically, the measurer 240 first identifies the position of the upper surface of the object based on, for example, the position where the peak waveform of the waveform data of the amount of light received by the first measurement sensor 211 occurs and the actual measurement position of the first sensor head 211a. The measurer 240 then identifies the position of the lower surface of the object based on, for example, the position where the peak waveform of the waveform data of the amount of light received by the second measurement sensor 212 occurs and the actual measurement position of the second sensor head 212a. The measurer 240 then calculates the distance between the positions of the upper and lower surfaces to measure the thickness of the object.

In the present embodiment, the measurer 240 measures the thickness of the object, but may measure, for example, displacement of the object or a distance to the object. For example, the measurer 240 may instead measure the physical quantity such as the height or the width of the object.

Example measurement of an object with the measurer 240 is described. First, measuring the thickness of a workpiece 600 serving as an example of the object illustrated in FIG. 6A is described. The workpiece 600 is a flat object with an upper surface and a lower surface. Laser light emitted from the first sensor head 211a above is reflected by the upper surface of the workpiece 600 and directly received by the first sensor head 211a, and laser light emitted from the second sensor head 212a below is reflected by the lower surface of the workpiece 600 and directly received by the second sensor head 212a. In this case, the image formation position and the received light amount of the laser light at the first sensor head 211a and the second sensor head 212a are distributed in a stable manner, and the waveform data generator 230 can thus generate waveform data having a single peak waveform illustrated in FIG. 4A. Thus, the measurer 240 can stably measure the thickness of the workpiece 600.

Measuring the thickness of a permeable workpiece 601 serving as an example of the object illustrated in FIG. 6B is described. Similarly to the workpiece 600, the permeable workpiece 601 is a flat object with an upper surface and a lower surface. Unlike the workpiece 600, the permeable workpiece 601 includes a material that transmits thereinto the emitted laser light through a surface onto which the laser light is emitted. As illustrated in FIG. 6A, when, for example, laser light is emitted from the first sensor head 211a above, part of the laser light beam is reflected by the upper surface and the remaining part of the laser light beam is transmitted inside, and the transmitted laser light beam may be received by the second sensor head 212a below the lower surface. Thus, the transmitted laser light may interfere with the laser light emitted from the second sensor head 212a below and reflected by the lower surface. Thus, the image formation position and the received light amount of laser light at the first sensor head 211a and the second sensor head 212a may be distributed in an unstable manner, and the waveform data generator 230 may generate waveform data with multiple peak waveforms as illustrated in FIGS. 4B and 5D. The measurer 240 may not measure the thickness of the permeable workpiece 601. To stably measure the thickness of the permeable workpiece 601, at least a laser light beam emitted from one of the measurement sensors or either the first sensor head 211a or the second sensor head 212a is to avoid interfering with light reception of the other measurement sensor, and the interference avoidance parameter is to be adjusted to an appropriate value. To stabilize the amount of laser light received by the first sensor head 211a and the second sensor head 212a, the emission light amount in the light-emission-amount adjustment area specification parameter may be adjusted to an appropriate value.

Figure 7A:
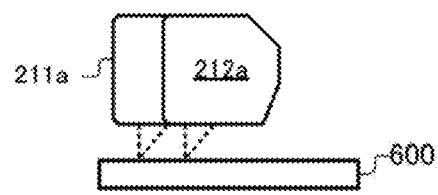
FIG. 7A is a diagram of a second measurement success example in the present embodiment.
Figure 7B:
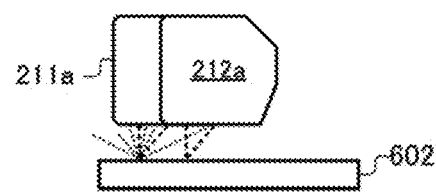
FIG. 7B is a diagram of a second measurement failure example in the present embodiment.

FIG. 7A is a diagram of a second measurement success example in the present embodiment, and FIG. 7B is a diagram of a second measurement failure example in the present embodiment.

Measuring the displacement of the upper surface of the workpiece 600 illustrated in FIG. 7A with the first sensor head 211a and the second sensor head 212a arranged side by side and located above the workpiece 600 is described. In this case as well, laser light emitted from the first sensor head 211a and reflected by the upper surface is directly received by the first sensor head 211a, and laser light emitted from the second sensor head 212a and reflected at a different position of the upper surface is directly received by the second sensor head 212a. Thus, the image formation position and the received light amount of laser light at the first sensor head 211a and the second sensor head 212a are distributed in a stable manner, the waveform data generator 230 can generate waveform data with a single peak waveform as illustrated in FIG. 4A, and the measurer 240 can stably measure the displacement of the upper surface of the workpiece 600.

Measuring the displacement of the upper surface of a scattering workpiece 602 serving as an example of the object illustrated in FIG. 7B is described. Similarly to the workpiece 600, the scattering workpiece 602 is a flat object with an upper surface and a lower surface. Unlike the workpiece 600, the scattering workpiece 602 has fine projections and recesses on the upper surface. As illustrated in FIG. 7A, when, for example, laser light is emitted from the first sensor head 211a above, the laser light diffusely reflects on the upper surface to be scattered, and part of the scattered laser light may be received by the second sensor head 212a. Thus, the scattered laser light may interfere with laser light emitted from the second sensor head 212a in a portion near the first sensor head 211a and reflected by the lower surface. Thus, the measurer 240 may not measure the displacement of the upper surface of the scattering workpiece 602, as in the example illustrated in FIG. 6B. To stably measure the displacement of the upper surface of the scattering workpiece 602, similarly to the example illustrated in FIG. 6B, at least a laser light beam emitted from one of the measurement sensors or either the first sensor head 211a or the second sensor head 212a is to avoid interfering with light reception of the other measurement sensor, and the interference avoidance parameter is to be adjusted to an appropriate value. To stabilize distribution of the image formation position and the received light amount of laser light at the first sensor head 211a and the second sensor head 212a, the values of the emission light amount, the measurement center position, the measurement start position, and the measurement end position in the light-emission-amount adjustment area specification parameter may be adjusted to appropriate values.

Figure 8A:
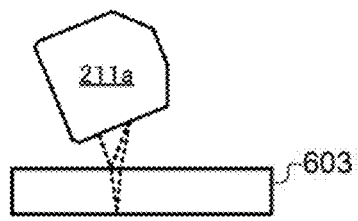
FIG. 8A is a diagram of a third measurement success example in the present embodiment.
Figure 8B:
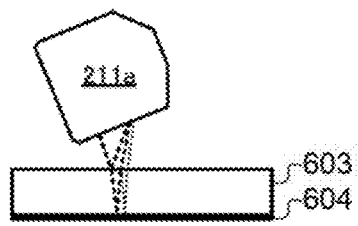
FIG. 8B is a diagram of a third measurement failure example in the present embodiment.

FIG. 8A is a diagram of a third measurement success example in the present embodiment, and FIG. 8B is a diagram of a third measurement failure example in the present embodiment.

Measuring the displacement of the upper and lower surfaces of a transparent workpiece 603 illustrated in FIG. 8A with a first measurement sensor alone is described. The transparent workpiece 603 is a flat transparent object with an upper surface and a lower surface. In this case, the laser light emitted from the first sensor head 211a and reflected by the upper surface is received by the first sensor head 211a, and laser light that has been transmitted through the transparent workpiece 603 and reflected by the lower surface is also received by the first sensor head 211a. In this case, as illustrated in FIG. 8A, the direction of a laser light beam reflected by the upper surface differs from the direction of a laser light beam reflected by the lower surface, and the laser light beams form images at different image formation positions at the first sensor head 211a. Thus, the image formation position and the received light amount of the laser light at the first sensor head 211a are distributed in a stable manner, the waveform data generator 230 can generate waveform data with non-illustrated two maximum peak waveforms, and the measurer 240 can stably measure, based on the waveform data, the displacement of the upper and lower surfaces of the transparent workpiece 603.

Measuring, with the first measurement sensor alone, the displacement of the upper and lower surfaces of the transparent workpiece 603 with a reflective plate 604 fixed to the lower surface of the transparent workpiece 603 illustrated in FIG. 8B, is described. In this case, part of a laser light beam reflected by the reflective plate 604 after transmission may be received by the first sensor head 211a, and the remaining part of the laser light beam may be reflected by the upper surface and the reflective plate 604 in this order and then received by the first sensor head 211a. In this case, as illustrated in FIG. 8B, the direction of a laser light beam reflected multiple times by the upper surface and the reflective plate 604 differs from the direction of a laser light beam reflected by the upper surface alone and the direction of a laser light beam reflected by the reflective plate 604 alone, and thus all the laser light beams form images at different image formation positions at the first sensor head 211a. Thus, the image formation position and the received light amount of laser light at the first sensor head 211a are distributed in an unstable manner, and the waveform data generator 230 may generate, although not illustrated, waveform data with three or more peak waveforms. The measurer 240 may not stably measure the displacement of the upper and lower surfaces of the transparent workpiece 603 based on the waveform data. To stably measure the displacement of the upper and lower surfaces of the transparent workpiece 603, at least the values of the emission light amount, the measurement center position, the measurement start position, and the measurement end position in the light-emission-amount adjustment area specification parameter are to be adjusted to appropriate values.

As described above, for the measurer 240 to stably measure the object, the parameters are to be adjusted in accordance with the characteristics of the measurement target object. Thus, the measurement system 100 according to the present embodiment adjusts the parameters set in the measurement device 200 by causing the training device 300, the trained model storage DB 400, and the parameter adjustment device 500 that can transmit and receive data with the measurement device 200 to operate in cooperation.

Figure 9:
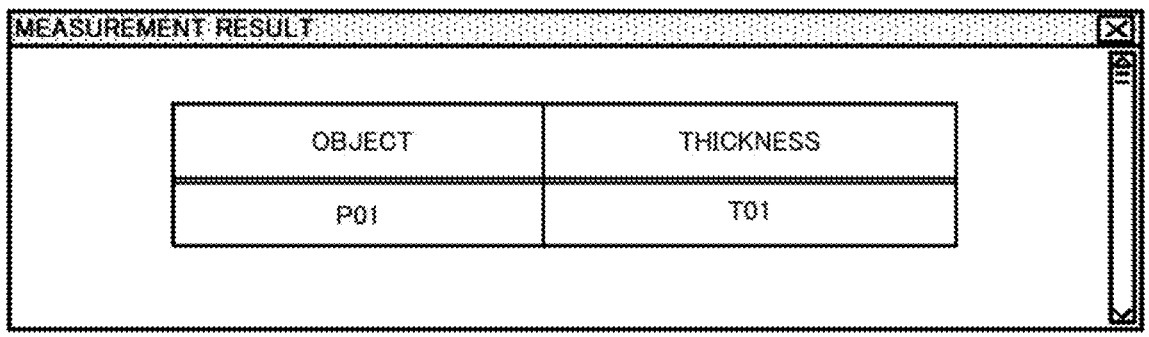
FIG. 9 is a diagram of a display example of a measurement result display screen in the present embodiment.

FIG. 9 is a diagram of a display example of a measurement result display screen in the present embodiment.

The measurement result display 250 displays, for example, a measurement result display screen illustrated in FIG. 9 to display measurement results acquired by the measurer 240. The measurement result display screen illustrated in FIG. 9 displays, for example, character images indicating the titles OBJECT and THICKNESS, and character images indicating the values P01 and T01.

In the present embodiment, the measurement result display 250 displays the thickness of an object on the measurement result display screen. In some embodiments, when the measurer 240 measures the physical quantities of the object such as the displacement, the height, and the width, the measurement result display 250 may display these physical quantities as measurement results.

The training data acquirer 310 acquires, as a training data set, waveform data generated by the waveform data generator 230 and data indicating the parameters set by the parameter setter 220 when the waveform data generator 230 generates the waveform data. More specifically, the training data acquirer 310 acquires training data sets each including waveform data of the amount of light received by the first measurement sensor 211 and data indicating the light-emission-amount adjustment area specification parameter and the interference avoidance parameter for the first measurement sensor 211 used to acquire the waveform data. The training data acquirer 310 acquires training data sets each including waveform data of the amount of light received by the second measurement sensor 212 and data indicating the light-emission-amount adjustment area specification parameter and the interference avoidance parameter for the second measurement sensor 212 used to acquire the waveform data. More specifically, the training data acquirer 310 acquires, for each of the measurement sensors 210, training data sets each including waveform data and data indicating the parameters used to acquire the waveform data.

The trained model generator 320 generates a trained model through machine learning using the training data sets acquired by the training data acquirer 310. The trained model generator 320 generates, based on the training data sets each including waveform data and data indicating the parameters used to acquire the waveform data, a trained model that enables estimation of parameters with which each measurement sensor 210 can measure an object in a new state in which new waveform data is acquired.

The trained model generator 320 generates a trained model through Q-learning, serving as an example of an algorithm of reinforcement learning known as an example of machine learning. Reinforcement learning is machine learning with which an agent, or an entity that takes an action, in a certain environment determines an action to be taken through observation of the current state or the environmental parameters. In reinforcement learning, an environment dynamically changes with actions taken by the agent, and the agent receives a reward in accordance with the environmental change. In reinforcement learning, the agent repeats the above operations and learns an action policy that maximizes the reward through a series of actions.

In Q-learning, an action value is calculated based on an action value function as an action policy that maximizes the reward. When the environmental state at time t is denoted with $s_t$, an action at time t is denoted with $a_t$, a state changed by the action $a_t$ is denoted with $s_{t+1}$, a reward acquired by changing the state from $s_t$ to $s_{t+1}$ is denoted with $r_{t+1}$, a discount rate is denoted with $\gamma$, and a learning coefficient is denoted with $\alpha$, $0<\gamma\leq1$ and $0<\alpha\leq1$. When the action value function is $Q(s_t, a_t)$, the general updated formula of the action value function $Q(s_t, a_t)$ is expressed with Formula 1 below.

$$Q(s_t, a_t) \leftarrow Q(s_t, a_t) + \alpha\left(r_{t+1} + \gamma\max_a Q(s_{t+1}, a) - Q(s_t, a_t)\right)$$

In Q-learning, with the action value denoted with Q, the action value Q is increased when the action value Q of the most valuable action $a_{t+1}$ at the time t+1 is higher than the action value Q of the action $a_t$ taken $a_t$ the time t, and the action value Q is decreased when the action value Q of the action $a_{t+1}$ is smaller than the action value Q of the action $a_t$. In other words, in Q-learning, the action value function $Q(s_t, a_t)$ is updated to approximate the action value Q of the action $a_t$ at the time t to the optimal action value at the time t+1. Thus, the optimal action value Q in a certain environment is sequentially propagated to the action value Q in the previous environment.

The trained model generator 320 applies a value based on the waveform data included in the training data sets to the state $s_t$, and applies a value based on the data indicating parameters included in the training data sets to the action $a_t$ to generate a trained model through Q-learning. The values based on waveform data may be used for the state $s_t$ with any method. For example, the numerical values of the received light amount for each position included in waveform data of the amount of light received by the first measurement sensor 211 are denoted with wa1, wa2, ..., wan, the numerical values of the received light amount for each position included in waveform data of the amount of light received by the second measurement sensor 212 are denoted with wb1, wb2, ..., wbn, and predetermined constants are denoted with ua1, ua2, ..., uan, ub1, ub2, ..., ubn. The state $s_t$ may be $s_t$=ua1×wa1+ua2×wa2+ ... +uan×wan+ub1×wb1+ub2×wb2+ ... +ubn×wbn.

The values based on data indicating the parameters may be used for the action $a_t$ with any method when the action $a_t$ can be calculated based on the action value function $Q(s_t, a_t)$ and the state $s_t$, and the values of the light-emission-amount adjustment area specification parameter and the interference avoidance parameter can be calculated based on the action $a_t$. For example, predetermined constants are denoted with va1, va2, va3, vb4, ..., van, ..., vb1, vb2, vb3, vb4, ..., vbn, .... The action $a_t$ may be $a_t$=va1×LI01+va2×CT01+va3×ST01+va4×ED01+ ... +van×SI01+ ... +vb1×LI02+vb2×CT01+vb3×ST02+vb4×ED02+...+vbn×SI01+.... In this case, constants va1, va2, va3, va4, ..., van, ..., vb1, vb2, vb3, vb4, ..., vbn, ... are to be set to calculate, from the action $a_t$ for each of the measurement sensors 210, emission light amount values LI01 and LI02, measurement center position values CT01 and CT02, measurement start position values ST01 and ST02, measurement end position values ED01, ED02, ..., and sampling interval values SI01, SI02, ... illustrated in FIG. 3.

Referring back to FIG. 1, the trained model generator 320 includes a reward calculator 321 that calculates the reward $r_{t+1}$ and a function updater 322 that updates the action value function $Q(s_t, a_t)$.

The reward calculator 321 calculates the reward $r_{t+1}$ based on the waveform data for each of the measurement sensors 210 included in the training data sets and the values of the light-emission-amount adjustment area specification parameter and the interference avoidance parameter for each of the measurement sensors 210 identified from data indicating the parameters. The reward calculator 321 calculates the reward $r_{t+1}$ based on the number of peak waveforms included in the waveform data. More specifically, when waveform data includes one peak waveform, the reward calculator 321 increases the reward $r_{t+1}$, and for example, provides a reward of +1. When waveform data includes zero or two or more peak waveforms, the reward calculator 321 decreases the reward $r_{t+1}$, and for example, provides a reward of −1.

The function updater 322 updates, based on the reward $r_{t+1}$ calculated by the reward calculator 321, the action value function $Q(s_t, a_t)$ that determines the values of the light-emission-amount adjustment area specification parameter and the interference avoidance parameter in a new state in which waveform data is input. The function updater 322 outputs data indicating the action value function $Q(s_t, a_t)$ to the trained model storage DB 400 as a trained model, and stores the data into the trained model storage 410.

Every time when the training data acquirer 310 acquires the training data set from the measurement device 200, the trained model generator 320 repeatedly calculates the reward $r_{t+1}$ and updates the action value function $Q(s_t, a_t)$. Every time when updating the action value function $Q(s_t, a_t)$ with the updated formula expressed with Formula 1 above, the trained model generator 320 outputs the updated action value function $Q(s_t, a_t)$ to the trained model storage DB 400 as a generated trained model, and stores the updated action value function $Q(s_t, a_t)$ into the trained model storage 410.

The waveform data acquirer 510 acquires waveform data generated by the waveform data generator 230. More specifically, the waveform data acquirer 510 acquires waveform data of the received light amount for each of the measurement sensors 210. For example, the waveform data acquirer 510 newly acquires waveform data including a numerical value of a received light amount for each position for each of the measurement sensors 210.

The parameter calculator 520 calculates parameters by applying the waveform data acquired by the waveform data acquirer 510 to the trained model stored in the trained model storage 410. The parameter calculator 520 calculates parameters estimated to identify one peak waveform from the waveform data acquired in a new state. More specifically, the parameter calculator 520 first acquires a trained model stored in the trained model storage 410, or more specifically, the action value function $Q(s_t, a_t)$. The parameter calculator 520 then calculates a new state $s_t$ from the numerical value of the received light amount for each position for each of the measurement sensors 210 included in the newly acquired waveform data. The parameter calculator 520 then calculates an optimal action $a_t$ based on the action value function $Q(s_t, a_t)$ and the new state $s_t$, and calculates, for example, the values of the emission light amount, the measurement center position, the measurement start position, the measurement end position, and the sampling interval based on the action $a_t$ for each of the measurement sensors 210.

The parameter outputter 530 outputs data indicating the parameters calculated by the parameter calculator 520 to the measurement device 200. The parameter setter 220 in the measurement device 200 updates the settings to the parameters identified from the data output from the parameter outputter 530.

Figure 10:
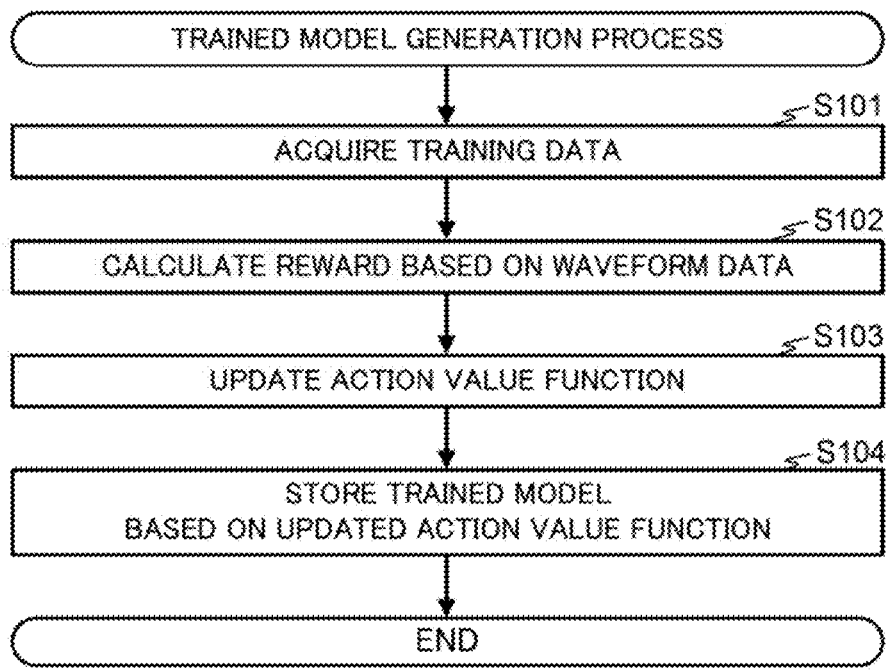
FIG. 10 is a flowchart of a trained model generation process in the present embodiment.

FIG. 10 is a flowchart of a trained model generation process in the present embodiment.

An operation performed by the training device 300 to generate a trained model is described with reference to the flowchart in FIG. 10. First, as illustrated in FIG. 10, the training data acquirer 310 acquires the training data sets from the measurement device 200 (step S101). For example, the training data acquirer 310 acquires, for each position included in the waveform data illustrated in FIG. 3, numerical values wa1, wa2, ..., wan, wb1, wb2, ..., wbn of the received light amount, emission light amount values LI01 and LI02, the measurement center position values CT01 and CT02, the measurement start position values ST01 and ST02, the measurement end position values ED01, ED02, ..., and the sampling interval values SI01, SI02, ... for each of the measurement sensors 210.

After acquiring the training data sets, the reward calculator 321 calculates the reward $r_{t+1}$ based on the waveform data included in the acquired training data sets (step S102). For example, the reward calculator 321 calculates the number of peak waveforms for each of the measurement sensors 210 from the numerical values wa1, wa2, ..., wan, wb1, wb2, ..., wbn of the received light amount for each position. When the waveform data has one peak waveform, the reward calculator 321 provides a reward of +1 to the reward $r_{t+1}$ to increase the reward. When the waveform data has zero or two or more peak waveforms, the reward calculator 321 provides a reward of −1 to the reward $r_{t+1}$ to decrease the reward.

After the reward is calculated, the function updater 322 updates the action value function $Q(s_t, a_t)$ based on the calculated reward $r_{t+1}$ (step S103). For example, the function updater 322 calculates the state $s_t$ from the numerical values wa1, wa2, ..., wan, wb1, wb2, ..., wbn of the received light amount, and calculates the action $a_t$ from the emission light amount values LI01 and LI02, the measurement center position values CT01 and CT02, the measurement start position values ST01 and ST02, the measurement end position values ED01, ED02, . . . , and the sampling interval values SI01, SI02, . . . . The function updater 322 updates the action value function $Q(s_t, a_t)$ with the updated formula expressed in Formula 1 above. After the function is updated, the trained model generator 320 outputs the trained model based on the updated action value function $Q(s_t, a_t)$ to the trained model storage DB 400 to store the trained model into the trained model storage 410 (step S104), and ends the trained model generation process.

Figure 11:
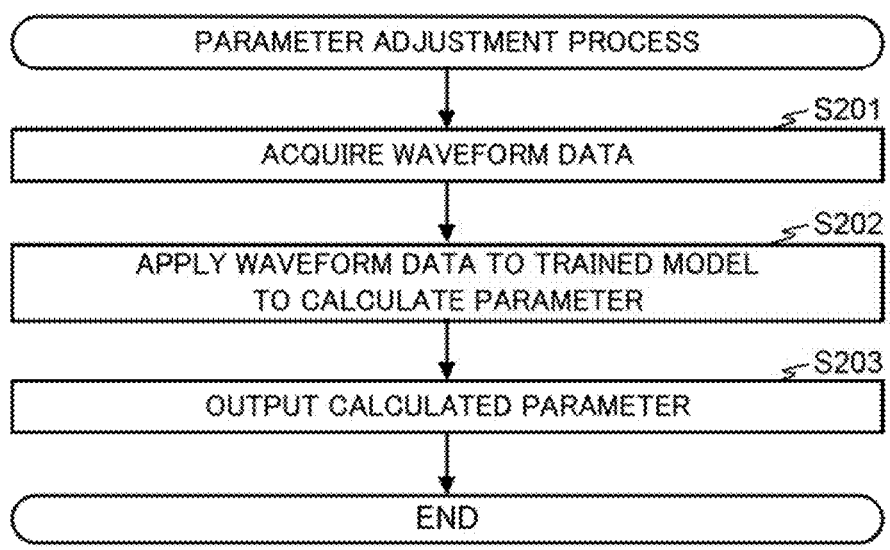
FIG. 11 is a flowchart of a parameter adjustment process in the present embodiment.

FIG. 11 is a flowchart of a parameter adjustment process in the present embodiment.

An operation performed by the parameter adjustment device 500 to adjust the parameters is described with reference to the flowchart in FIG. 11. First, as illustrated in FIG. 11, the waveform data acquirer 510 acquires waveform data from the measurement device 200 (step S201). For example, the waveform data acquirer 510 newly acquires waveform data including a numerical value of the received light amount for each position for each of the measurement sensors 210.

After the waveform data is acquired, the parameter calculator 520 applies the waveform data acquired by the waveform data acquirer 510 to the trained model stored in the trained model storage 410 to calculate the parameters (step S202). For example, the parameter calculator 520 acquires the action value function $Q(s_t, a_t)$ stored in the trained model storage 410, and calculates a new state $s_t$ from the numerical value of the received light amount for each position for each of the measurement sensors 210 included in the newly acquired waveform data. The parameter calculator 520 then calculates the optimal action $a_t$ based on the action value function $Q(s_t, a_t)$ and the new state $s_t$, and calculates, for example, the values of the emission light amount, the measurement center position, the measurement start position, the measurement end position, and the sampling interval based on the action $a_t$ for each of the measurement sensors 210. After the parameters are calculated, the parameter outputter 530 outputs data indicating the calculated parameters to the measurement device 200 (step S203), updates the settings to the parameters identified from the data output to the parameter setter 220, and ends the parameter adjustment process.

Figure 12:
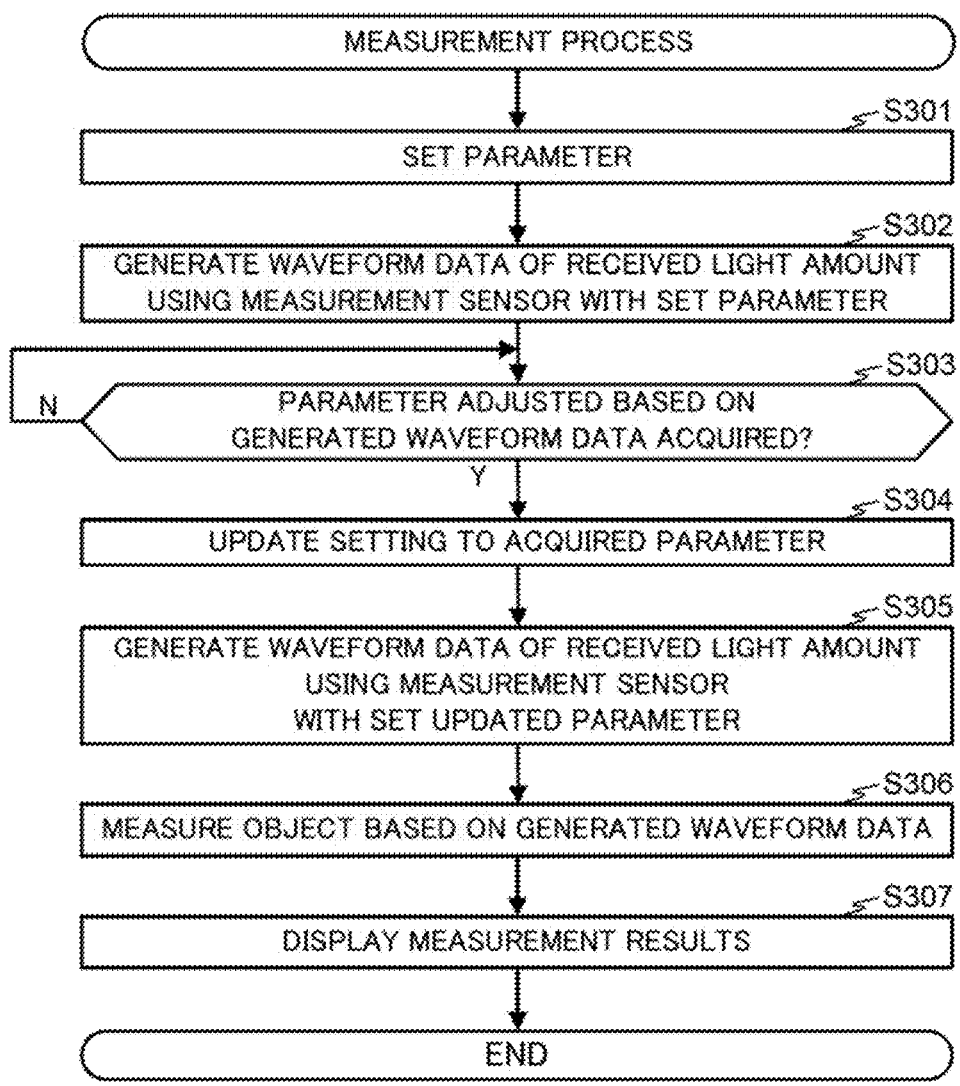
FIG. 12 is a flowchart of a measurement process in the present embodiment.

FIG. 12 is a flowchart of the measurement process in the present embodiment.

An operation performed by the measurement device 200 to measure an object is described with reference to the flowchart in FIG. 12. First, as illustrated in FIG. 12, the parameter setter 220 sets appropriate values as parameters for each measurement sensor 210 (step S301). After the parameters are set, the waveform data generator 230 generates waveform data of the amount of laser light received from the object by each measurement sensor 210 in response to emission of laser light onto the object with the set parameters (step S302). The waveform data generator 230 outputs the generated waveform data to the parameter adjustment device 500, although not illustrated.

After the waveform data is output, the parameter setter 220 determines whether the parameter setter 220 has acquired, from the parameter adjustment device 500, data indicating the parameters adjusted based on the generated waveform data (step S303). When the parameter setter 220 has not acquired data indicating the parameters (N in step S303), the parameter setter 220 repeats the process in step S303 until acquiring the data indicating the parameters. When the parameter setter 220 has acquired data indicating the parameters (Y in step S303), the parameter setter 220 updates the settings to the parameters identified from the acquired data (step S304). After the parameter setting is updated, the waveform data generator 230 generates the waveform data of the amount of light received by each measurement sensor 210 with the set updated parameters (step S305). After the waveform data is generated, the measurer 240 measures the object based on the generated waveform data (step S306), the measurement result display 250 displays measurement results on the measurement result display screen (step S307), and the measurement process ends.

As described above, in the measurement system 100 according to the present embodiment, the trained model storage 410 stores the trained model generated by the trained model generator 320. The parameter calculator 520 applies the new waveform data acquired by the waveform data acquirer 510 to the trained model stored in the trained model storage 410 to calculate parameters that enable measurement of an object with each measurement sensor 210 in anew state. The parameter outputter 530 then outputs data indicating the parameters calculated by the parameter calculator 520 to the measurement device 200.

Thus, the measurement system 100 can appropriately measure an object with each measurement sensor 210 using parameters identified from data output from the parameter adjustment device 500.

In particular, in the measurement system 100 according to the present embodiment, the trained model generator 320 generates a trained model through machine learning using the training data sets including waveform data of the amount of light received by each measurement sensor 210 and data indicating the parameters used to acquire the waveform data.

Thus, the measurement system 100 can appropriately measure an object with each measurement sensor 210 using the parameters calculated using the trained model generated by the training device 300.

In a publicly known measurement system, a user manually selects and sets parameters. Thus, the publicly known measurement system involves manual analysis of the relationship between the waveform data and the parameters until acquiring the waveform data that enables appropriate object measurement.

In contrast, in the measurement system 100 according to the present embodiment, the training device 300 automatically acquires the training data sets including waveform data and data indicating the parameters used to acquire the waveform data from the measurement device 200, and automatically generates a trained model through machine learning using the acquired training data sets. The parameter adjustment device 500 in the measurement system 100 automatically acquires new waveform data from the measurement device 200, automatically calculates the parameters adjusted by applying the acquired waveform data to the trained model, and outputs the parameters to the measurement device 200. The measurement device 200 updates the settings to the automatically adjusted parameters.

Thus, the measurement system 100 can automatically adjust the parameters that have been manually adjusted in a publicly known measurement system, and the measurement device 200 can appropriately measure the object with the adjusted parameters. Thus, the measurement system 100 can reduce the workload or working hours of the user compared with the publicly known measurement system.

In the measurement system 100 according to the present embodiment, the parameters include the light-emission-amount adjustment area specification parameter. The parameter adjustment device 500 in the measurement system 100 adjusts the light-emission-amount adjustment area specification parameter to avoid specifying a nontarget peak waveform as illustrated in FIGS. 4B and 5C.

Thus, the measurement system 100 can set the adjusted light-emission-amount adjustment area specification parameter to facilitate object measurement more than a measurement system that does not measure an object. In addition, the measurement system 100 can automatically specify the emission light adjustment area. Thus, despite no manual specifying of the emission light adjustment area from a user of the measurement system, the measurement system 100 can appropriately measure the object from the waveform data that identifies the measurement target peak waveform.

In particular, in the measurement system 100 according to the present embodiment, the light-emission-amount adjustment area specification parameter includes parameters corresponding to the emission light amount, the measurement center position, the measurement start position, and the measurement end position.

Thus, the measurement system 100 can reduce shortage of the received light amount used to measure an object compared with a measurement system that cannot specify the emission light amount or a measurement system that cannot specify an area for which the emission light amount is adjusted. Thus, the measurement system 100 facilitates object measurement.

In the present embodiment, the light-emission-amount adjustment area specification parameter includes parameters corresponding to the emission light amount, the measurement center position, the measurement start position, and the measurement end position, but may include any parameters that specify an area for which the emission light amount is adjusted. For example, the light-emission-amount adjustment area specification parameter may include an emission light angle indicating an angle $a_t$ which laser light is emitted.

As in the present embodiment, the parameters may include the light-emission-amount adjustment area specification parameter to facilitate object measurement, but may include any parameter that enables object measurement through an adjustment. For example, the parameters may include the interference avoidance parameter for each of the first measurement sensor 211 and the second measurement sensor 212 without including the light-emission-amount adjustment area specification parameter.

In the measurement system 100 according to the present embodiment, the parameters include the interference avoidance parameter for each of the first measurement sensor 211 and the second measurement sensor 212. The parameter adjustment device 500 in the measurement system 100 adjusts the interference avoidance parameter to prevent laser light emitted from the first measurement sensor 211 from interfering with light reception of the second measurement sensor 212 as illustrated in FIGS. 6B and 7B, and to prevent laser light emitted from the second measurement sensor 212 from interfering with light reception of the first measurement sensor 211.

Thus, the measurement system 100 can set the adjusted interference avoidance parameter to facilitate object measurement more than a measurement system that does not measure an object. The measurement system 100 can thus automatically activate the interference avoidance function, and can appropriately measure an object based on the waveform data from which the measurement target peak waveform is identified without a user of the measurement system manually activating the interference avoidance function.

In particular, in the measurement system 100 according to the present embodiment, the interference avoidance parameter includes a parameter corresponding to the sampling interval for each of the measurement sensors 210.

Thus, the measurement system 100 can more easily prevent a laser light beam emitted from either the first measurement sensor 211 or the second measurement sensor 212 from interfering with light reception of the other measurement sensor than a measurement system that cannot specify the sampling interval. Thus, the measurement system 100 facilitates object measurement.

In the present embodiment, the interference avoidance parameter includes a parameter corresponding to the sampling interval for each of the measurement sensors 210, but may include any parameter with which the laser light emitted from one of the measurement sensors can avoid interfering with light reception of the other measurement sensor. For example, the interference avoidance parameter may include an emission light angle indicating the angle at which laser light is emitted for each of the measurement sensors 210, and the moving speed in measurement for each of the measurement sensors 210.

To facilitate object measurement as in the present embodiment, the parameters may include the interference avoidance parameter for each of the first measurement sensor 211 and the second measurement sensor 212, but may include any parameter that enables object measurement through an adjustment. For example, the parameters may include the light-emission-amount adjustment area specification parameter alone without including the interference avoidance parameter for each of the first measurement sensor 211 and the second measurement sensor 212.

In the measurement system 100 according to the present embodiment, one or more peak waveforms are identifiable by the trained model generator 320 from the waveform data included in the training data sets. The reward calculator 321 enhances the evaluation of a training data set from which one peak waveform is identified, and lowers the evaluation of a training data set from which no peak waveform is identified or multiple peak waveforms are identified to calculate a reward $r_{t+1}$.

Thus, the parameter calculator 520 in the measurement system 100 facilitates calculation of the parameters used to acquire a waveform data piece from which one peak waveform is identified in a new state by applying the acquired new waveform data piece to the trained model generated by the trained model generator 320. The measurement system 100 thus facilitates object measurement using each measurement sensor 210 more than a measurement system that does not enhance evaluation of a training data set from which one peak waveform is identified or a measurement system that does not lower evaluation of a training data set from which no peak waveform is identified or multiple peak waveforms are identified.

To facilitate object measurement as in the present embodiment, the reward calculator 321 may enhance the evaluation of a training data set from which one peak waveform is identified and lower the evaluation of a training data set from which no peak waveform is identified or multiple peak waveforms are identified. In some embodiments, the reward calculator 321 may also enhance the evaluation of a training data set from which multiple peak waveforms are identified when a difference between the maximum value of the received light amount of the maximum peak waveform and the maximum values of the received light amount of the other peak waveforms exceeds a predetermined threshold. In some embodiments, the reward calculator 321 may also enhance the evaluation of a training data set from which multiple peak waveforms are identified when the maximum value of the received light amount of the maximum peak waveform is within a predetermined numerical value range, whereas the maximum values of the received light amount of other peak waveforms are out of the predetermined numerical value range.

In the measurement system 100 according to the present embodiment, the parameter calculator 520 calculates parameters estimated to identify one peak waveform from the waveform data acquired in a new state using a trained model generated by the trained model generator 320.

Thus, the measurement system 100 facilitates object measurement using each measurement sensor 210 more than a measurement system that does not calculate parameters estimated to identify one peak waveform from the waveform data acquired in a new state using a trained model.

As in the present embodiment, to facilitate object measurement, the parameter calculator 520 may calculate parameters estimated to identify one peak waveform from the newly acquired waveform data, but may calculate any parameter that enables object measurement. For example, the parameter calculator 520 may also calculate parameters estimated to identify multiple peak waveforms from the newly acquired waveform data when a difference between the maximum value of the received light amount of the maximum peak waveform and the maximum values of the received light amount of the other peak waveforms exceeds a predetermined threshold. In some embodiments, the parameter calculator 520 may also calculate parameters estimated to identify multiple peak waveforms from the newly acquired waveform data when the maximum value of the received light amount of the maximum peak waveform is within a predetermined numerical value range, whereas the maximum values of the received light amount of other peak waveforms are out of the predetermined numerical value range.

In the present embodiment, the trained model generator 320 generates a trained model through Q-learning as an example of a reinforcement learning algorithm. In some embodiments, the trained model generator 320 may generate a trained model using another reinforcement learning algorithm. For example, the trained model generator 320 may generate a trained model through temporal difference learning (TD-learning). Although the trained model generator 320 generates a trained model with a reinforcement learning algorithm, the trained model generator 320 may generate a trained model with a known algorithm such as supervised or unsupervised learning. The trained model generator 320 may generate a trained model with a known learning algorithm, such as deep learning, a neural network, genetic programming, functional logic programming, or support-vector machines.

In the present embodiment, the measurement device 200, the training device 300, the trained model storage DB 400, and the parameter adjustment device 500 can transmit or receive data through a LAN, but may transmit or receive data with other methods. For example, the measurement device 200, the training device 300, the trained model storage DB 400, and the parameter adjustment device 500 may transmit or receive data through a communication cable with which the measurement device 200, the training device 300, the trained model storage DB 400, and the parameter adjustment device 500 are connected. For example, the measurement device 200, the training device 300, the trained model storage DB 400, and the parameter adjustment device 500 may transmit or receive data through the Internet. For example, the training device 300, the trained model storage DB 400, and the parameter adjustment device 500 may serve as a cloud server. The training device 300, the trained model storage DB 400, and the parameter adjustment device 500 may generate a trained model through machine learning based on the training data sets acquired from the measurement device 200, store the trained model, and output the parameter adjusted based on the waveform data newly acquired from the measurement device 200.

In the present embodiment, the training device 300 includes the trained model generator 320. In some embodiments, the parameter adjustment device 500 may include the trained model generator 320. In other words, the parameter adjustment device 500 may include the training data acquirer 310 and the trained model generator 320, and the parameter adjustment device 500 may perform the trained model generation process illustrated in FIG. 10.

The measurement device 200, the training device 300, the trained model storage DB 400, and the parameter adjustment device 500 are separate devices in the present embodiment, but may be integrated. In other words, in addition to the measurement sensors 210, the parameter setter 220, the waveform data generator 230, the measurer 240, and the measurement result display 250, the measurement device 200 in the measurement system 100 may include the training data acquirer 310, the trained model generator 320, the trained model storage 410, the waveform data acquirer 510, the parameter calculator 520, and the parameter outputter 530. In some embodiments, when the training device 300, the trained model storage DB 400, and the parameter adjustment device 500 together serve as a cloud server, these devices may be integrated selectively. In other words, the cloud server may include the training data acquirer 310, the trained model generator 320, the trained model storage 410, the waveform data acquirer 510, the parameter calculator 520, and the parameter outputter 530.

As in the present embodiment, the training data acquirer 310 may acquire the training data sets from the measurement device 200. In some embodiments, the training data acquirer 310 may acquire any training data sets including waveform data and data indicating the parameters used to generate the waveform data. For example, the training data acquirer 310 may acquire, from a measurement device different from the measurement device 200, the training data sets that includes waveform data and data indicating the parameters for the measurement sensor used to generate the waveform data. In other words, the training device 300 may acquire the training data sets from a measurement device or a measurement system different from the measurement system 100, and generate a trained model through machine learning using the acquired training data sets. Thus, the measurement system 100 may adjust, with the parameter adjustment device 500, the parameters used by the measurement device 200 with the trained model generated in advance by another measurement system. In this case as well, the training device 300 may update the trained model generated in advance by acquiring new training data sets from the measurement device 200 for appropriate object measurement of the measurement device 200.

In the present embodiment, the measurement device 200 includes two measurement sensors 210 including the first measurement sensor 211 and the second measurement sensor 212. In some embodiments, the measurement device 200 may include one measurement sensor 210 or three or more measurement sensors 210. When the measurement device 200 includes three or more measurement sensors 210, the multiple measurement sensors may be located in the same area as illustrated in FIGS. 6A and 6B, or in different areas as illustrated in FIGS. 7A and 7B. When the measurement device 200 includes one measurement sensor 210, the training device 300 may generate a trained model through machine learning using the training data sets for the measurement sensor 210, and the parameter adjustment device 500 may calculate a parameter for the measurement sensor 210 by applying the newly acquired waveform data to the generated trained model. When the measurement device 200 includes n measurement sensors 210, where n is an integer greater than or equal to 3, the training device 300 may generate a trained model through machine learning using the training data sets for the n measurement sensors 210, and the parameter adjustment device 500 may calculate parameters for the n measurement sensors 210 by applying the newly acquired waveform data to the generated trained model.

As in the present embodiment, the measurement device 200 may use the same number of the measurement sensors 210 to measure objects regardless of the timing of measurement. In some embodiments, the measurement device 200 may use more or fewer measurement sensors 210 to measure objects depending on the timing of measurement. When using fewer measurement sensors 210, the measurement device 200 may simply not use the parameter for the unused measurement sensor among the parameters output from the parameter adjustment device 500. When using more measurement sensors 210, the measurement device 200 is to cause the training device 300 to acquire training data sets for the newly added measurement sensor to generate a new trained model, and cause the parameter adjustment device 500 to acquire newly acquired waveform data using the newly added measurement sensor, and to output a parameter adjusted by using the new trained model.

In the present embodiment, the training device 300 updates the trained model every time when newly acquiring training a data set without storing the training data set acquired when updating the trained model. In some embodiments, the training device 300 may store the acquired training data set. For example, the training device 300 may include a training data storage that stores all the training data sets acquired by the training data acquirer 310. In this case, the training data storage is to store, for example, the training data sets for each of the measurement sensors 210 together with data about the acquired date and time.

The main operating portions of the measurement device 200, the training device 300, and the parameter adjustment device 500 each including, for example, the controller 51, the main storage 52, the external storage 53, the operation device 54, the display 55, the transmitter-receiver 56, and the internal bus 50 can be achieved by a common computer system instead of a dedicated system. For example, a computer program for performing the above operation may be stored in a non-transitory computer-readable recording medium, such as a flexible disk or a digital versatile disk read-only memory (DVD-ROM), distributed, and installed in a computer to achieve the measurement device 200, the training device 300, and the parameter adjustment device 500 that perform the above processes. In some embodiments, the computer program may be stored in a storage device included in a server device on a communication network, and downloaded to a common computer system to achieve the measurement device 200, the training device 300, and the parameter adjustment device 500.

When the functions of the measurement system 100 are achievable partly by the operating system (OS) or through cooperation between the OS and an application program, the application program may be stored alone in a non-transitory recording medium or a storage device.

The computer program may be superimposed on a carrier wave and provided through a communication network. For example, the computer program may be posted on a bulletin board system (BBS) on a communication network, and provided through the network. The above processes may be performed by launching the computer program and executing the computer program under control by the OS in the same manner as in another application program.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

50 Internal bus
51 Controller
52 Main storage
53 External storage
54 Operation device
55 Display
56 Transmitter-receiver
59 Control program
100 Measurement system
200 Measurement device
210 Measurement sensor
211 First measurement sensor
211a First sensor head
212 Second measurement sensor
212a Second sensor head
220 Parameter setter
230 Waveform data generator
240 Measurer
250 Measurement result display
300 Training device
310 Training data acquirer
320 Trained model generator
321 Reward calculator
322 Function updater
400 Trained model storage DB
410 Trained model storage
500 Parameter adjustment device
510 Waveform data acquirer
520 Parameter calculator
530 Parameter outputter
600 Workpiece
601 Permeable workpiece
602 Scattering workpiece
603 Transparent workpiece
604 Reflective plate

The invention claimed is:

1. A parameter adjustment device for adjusting a parameter relating to control of laser light emitted from a measurement sensor onto an object, the parameter adjustment device comprising:

a parameter calculator to calculate the parameter by applying, to a trained model generated through machine learning using training data sets each including waveform data of an amount of laser light received by the measurement sensor from a training object included in the object and data indicating the parameter used to acquire the waveform data, waveform data newly acquired in a new state in which the measurement sensor emits laser light onto a measurement object included in the object, the parameter calculated by the parameter calculator enabling measurement of the measurement object using the measurement sensor in the new state; and a parameter outputter to output data indicating the parameter calculated by the parameter calculator.

2. The parameter adjustment device according to claim 1, wherein the parameter includes a light-emission-amount adjustment area specification parameter specifying an area for which the amount of laser light emitted from the measurement sensor is adjusted.

3. The parameter adjustment device according to claim 2, wherein when a first measurement sensor and a second measurement sensor are used as the measurement sensor, the parameter includes an interference avoidance parameter for preventing laser light emitted from one of the first measurement sensor or the second measurement sensor from interfering with light reception by another of the first measurement sensor or the second measurement sensor.

4. The parameter adjustment device according to claim 2, further comprising:

a trained model generator to generate the trained model through the machine learning using the training data sets.

5. The parameter adjustment device according to claim 1, wherein when a first measurement sensor and a second measurement sensor are used as the measurement sensor, the parameter includes an interference avoidance parameter for preventing laser light emitted from one of the first measurement sensor or the second measurement sensor from interfering with light reception by another of the first measurement sensor or the second measurement sensor.

6. The parameter adjustment device according to claim 5, further comprising:

a trained model generator to generate the trained model through the machine learning using the training data sets.

7. The parameter adjustment device according to claim 1, further comprising:

a trained model generator to generate the trained model through the machine learning using the training data sets.

8. The parameter adjustment device according to claim 7, wherein one or more peak waveforms are identifiable by the trained model generator from the waveform data included in the training data sets, and the machine learning performed by the trained model generator includes enhancing evaluation of a training data set of the training data sets from which one peak waveform is identified and lowering evaluation of a training data set of the training data sets from which no peak waveform is identified or a plurality of peak waveforms are identified.

9. The parameter adjustment device according to claim 8, wherein the parameter calculator calculates the parameter such that an estimated number of peak waveforms identified from the waveform data acquired in the new state with the calculated parameter is one.

10. A training device comprising:

a trained model generator to generate, before a measurement sensor measures a measurement object included in an object with setting thereto of a parameter relating to control of laser light emitted onto the measurement object from the measurement sensor in a state of measuring the measurement object based on waveform data of an amount of laser light received by the measurement sensor from the measurement object, a trained model through machine learning using training data sets acquired in advance, the training data sets each including waveform data of an amount of laser light received by the measurement sensor from a training object included in the object and data indicating a parameter used to acquire the waveform data.

11. A measurement system comprising:

a trained model generator to generate a trained model through machine learning using training data sets each including waveform data of an amount of laser light received by a measurement sensor from a training object included in an object and data indicating a parameter relating to control of laser light emitted from the measurement sensor onto the training object to acquire the waveform data;

a parameter calculator to calculate, by applying waveform data newly acquired in a new state in which the measurement sensor emits laser light onto a measurement object included in the object to the trained model generated by the trained model generator, a parameter for the new state;

a parameter setter to set the parameter calculated by the parameter calculator to the measurement sensor; and a measurer to measure the measurement object based on waveform data acquired by the measurement sensor with the parameter set by the parameter setter.

* * * * *